US006945609B2

(12) United States Patent  (10) Patent No.: US 6,945,609 B2
Barney  (45) Date of Patent: Sep. 20, 2005

(54) WHEEL COVER APPARATUS AND ASSOCIATED METHODS

(75) Inventor: Anthony Barney, Draper, UT (US)

(73) Assignee: Advance Engineering Technology, West Valley City, UT (US)

( * ) Notice: Subject to any disclaimer, the term of this patent is extended or adjusted under 35 U.S.C. 154(b) by 0 days.

(21) Appl. No.: 10/778,295

(22) Filed: Feb. 13, 2004

(65) Prior Publication Data

US 2005/0179311 A1  Aug. 18, 2005

(51) Int. Cl.[7] .............................................. B60B 7/04
(52) U.S. Cl. ............................. 301/37.25; 301/37.35; 301/37.105
(58) Field of Search ........................ 301/37.102, 37.25, 301/37.101, 35.625, 35.626, 35.62, 37.42, 301/37.34, 37.33, 37.31, 37.23, 37.105, 37.104, 301/37.12, 37.376, 37.375, 37.374, 37.373

(56) References Cited

U.S. PATENT DOCUMENTS

| | | | |
|---|---|---|---|
| 1,432,274 A | 10/1922 | Braucher | |
| 1,955,735 A | 4/1934 | Cheatham | |
| 2,130,220 A | 9/1938 | Ball et al. | |
| 2,762,469 A | 9/1956 | Lyon | |
| 2,935,361 A | 5/1960 | Aske | |
| 2,954,629 A | 10/1960 | Matin | |
| 2,997,344 A | 8/1961 | Whiteman | |
| 3,158,946 A | 12/1964 | Upchurch | |
| 3,219,391 A | 11/1965 | Hettinger | |
| 3,317,247 A * | 5/1967 | Lamme | ................... 301/37.38 |
| 3,495,347 A | 2/1970 | Sims | |
| 3,722,958 A | 3/1973 | Marshall | |
| 3,810,679 A | 5/1974 | Myers | |
| 3,918,186 A * | 11/1975 | Gray | .......................... 40/591 |
| 3,965,708 A | 6/1976 | Smiley | |
| 4,410,217 A * | 10/1983 | Loren | ..................... 301/37.21 |
| 5,190,354 A | 3/1993 | Levy et al. | |
| 5,290,094 A | 3/1994 | Gragg | |
| 5,503,465 A * | 4/1996 | Price et al. | ............ 301/37.374 |
| 5,542,750 A * | 8/1996 | FitzGerald | ............. 301/37.376 |
| 6,045,195 A * | 4/2000 | Okamoto | ............... 301/37.376 |
| 6,536,848 B1 * | 3/2003 | Goodman | ................ 301/37.25 |
| 6,655,061 B1 * | 12/2003 | Good | .......................... 40/587 |
| 6,663,187 B2 * | 12/2003 | Fitzgerald | ................ 301/37.25 |

* cited by examiner

Primary Examiner—Frantz F. Jules
(74) Attorney, Agent, or Firm—Thorpe North & Western, LLP

(57) ABSTRACT

A wheel cover apparatus for augmenting a vehicle wheel to provide various aesthetic appearances while also allowing for relatively easy removal without sacrificing security. A releasable connector can be used to releasably secure the wheel cover to a mounting member. The mounting member can be attached to vehicle wheel lug bolts. In order to provide a releasable connection the connector assembly can include a receiving assembly and an engaging assembly such as a ball lock mechanism. Further, the present invention can include a bearing which allows the wheel cover to rotate independently of the mounting member. Such rotation can be free rotation or weighted such that the wheel cover remains in substantially the same orientation during travel as when at rest. In this way, designs or images on the wheel cover can be viewed during motion of the vehicle.

25 Claims, 3 Drawing Sheets

WHEEL COVER APPARATUS AND ASSOCIATED METHODS

FIELD OF THE INVENTION

The present invention relates generally to devices used to secure wheel covers to a vehicle wheel. Accordingly, the present invention involves the fields of automotive, mechanical, and materials science.

BACKGROUND OF THE INVENTION

In the past half century, automobiles have become nearly a staple consumer product owned by most citizens of the United States and many other countries. Automobiles and other vehicles can provide functional, as well as aesthetic benefits to the consumer. Particularly, vehicle wheels are often provided with either a standard metal rim or custom alloy rims as part of the wheel assembly. Frequently, it can be desirable to augment an existing vehicle wheel with a hubcap or other similar wheel covering. Such wheel coverings can provide improved appearance, unique aesthetic effects, advertising, and the like. Wheel coverings are known which can rotate independently of the wheel. Such wheel coverings can provide the appearance of a stationary or slowly moving wheel on a moving vehicle.

However, typical rotating wheel covers include hardware which results in a permanent or semi-permanent securing of the wheel cover to the wheel. This can make removal of such wheel covers difficult and time-consuming. Conversely, standard hubcaps are commonly secured using interference fittings with the wheel rim. Such interference fitted hubcaps are easily stolen or lost during travel. Thus, many available wheel covers have limitations which decrease convenience to a consumer.

SUMMARY OF THE INVENTION

It has been recognized that it would be advantageous to develop wheel covers which provide various aesthetic appearances while also allowing for relatively easy removal without sacrificing security.

In one aspect, the present invention resolves the problems set forth above by providing a wheel cover apparatus which includes a releasable connector which secures the wheel cover to a mounting member attached to the wheel assembly of a vehicle. More specifically, the mounting member can be attached to the wheel lug bolts. The releasable connector assembly can be operatively connected to the mounting member. In order to provide a releasable connection, the connector assembly can include a receiving assembly and an engaging assembly. The wheel cover can also be operatively connected to the releasable connector.

The present invention can involve releasably connecting a wheel cover such that the wheel cover spins with the vehicle wheel. However, in another aspect of the present invention, the wheel cover apparatus can rotate independently of the mounting member. Such rotation can be a free rotation which provides an appearance of the wheels spinning at a different rate than the wheel cover. In order to facilitate rotation, at least one of the receiving assembly and the engaging assembly can include a rotating assembly which allows the wheel cover to rotate independently of the mounting member. Depending on the specific design configuration, the rotating assembly can be included in either the receiving assembly or the engaging assembly. Bearings can be effectively used, though other mechanisms for allowing rotation may also be suitable. In an alternative aspect of the present invention, the wheel cover can be weighted. A weighted wheel cover in conjunction with a rotating assembly can allow the wheel cover to remain in substantially the same orientation as when at rest during rotation of the mounting member. In this way, designs or images on the wheel cover will not rotate and can be viewed during motion of the vehicle.

In still another aspect of the present invention, the releasable connector can include a mechanism for releasing the receiving assembly and the engaging assembly from one another. In one specific aspect, the receiving assembly can include a releasable detent and the engaging assembly can include an engagement surface configured to accept the releasable detent.

In yet another detailed aspect of the present invention, the wheel cover can be configured having any number of shapes and sizes. For example, the wheel cover can at least partially cover the wheel lug bolts. By covering the lug bolts, the wheel cover can cover the lug bolts from view and serve as additional wheel theft deterrence.

There has thus been outlined, rather broadly, various features of the invention so that the detailed description thereof that follows may be better understood, and so that the present contribution to the art may be better appreciated. Other features of the present invention will become clearer from the following detailed description of the invention, taken in conjunction with the drawings and the accompanying claims, or may be learned by the practice of the invention.

DETAILED DESCRIPTION

Figure 1:
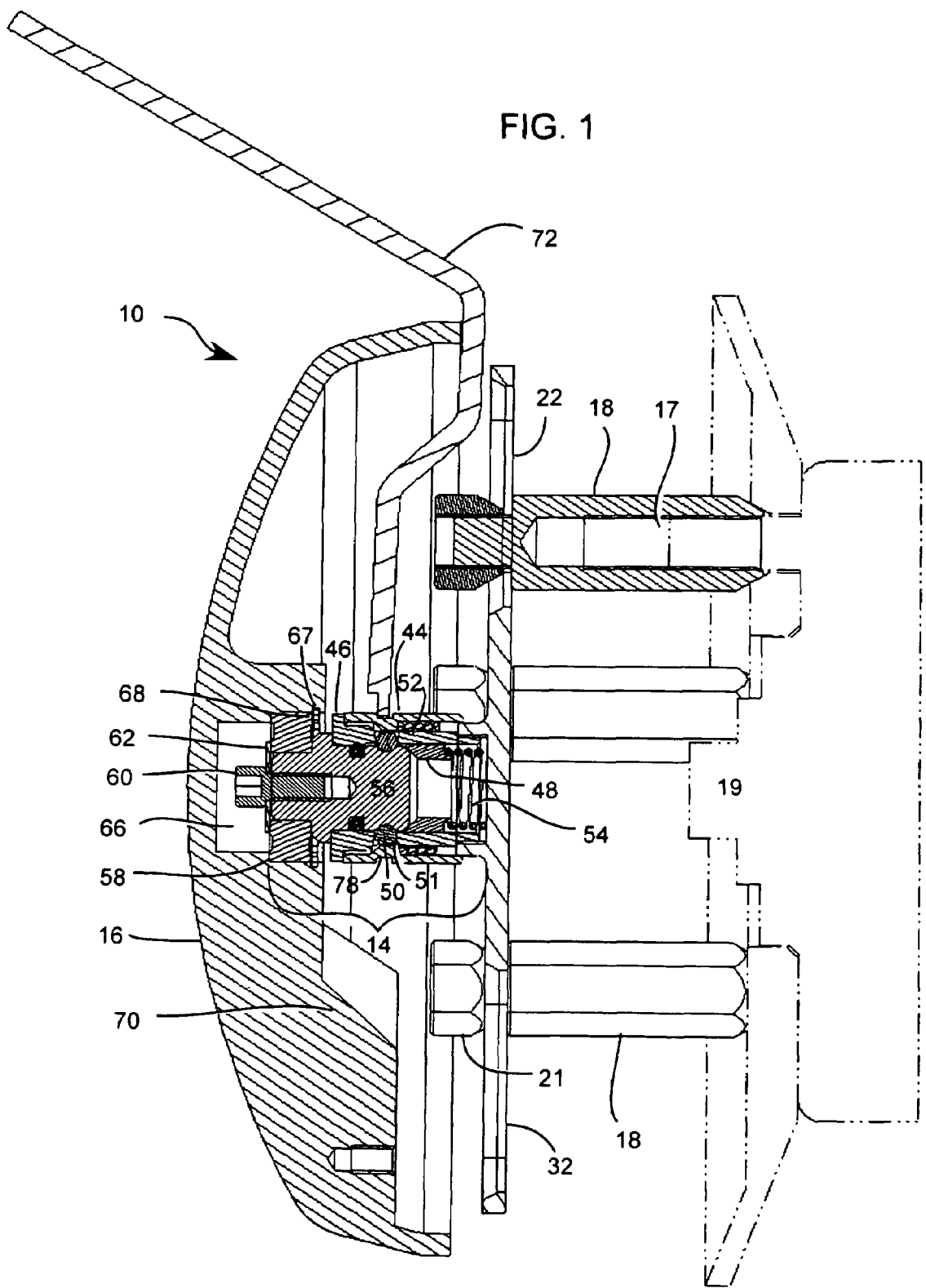
FIG. 1 is a side cross-sectional view of a wheel cover in accordance with an embodiment of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features, process steps, and materials illustrated herein, and additional applications of the principles of the inventions as illustrated herein, which would occur to one skilled in the relevant art and having possession of this disclosure, are to be considered within the scope of the invention. It should also be understood that terminology employed herein is used for the purpose of describing particular embodiments only and is not intended to be limiting.

Referring now to FIG. 1, one embodiment of a wheel cover apparatus, shown generally at 10, includes a mounting member 12, a releasable connector assembly 14, and a wheel cover 16. The releasable connector assembly is configured to releasably attach the wheel cover to the mounting member. The mounting member can be any body which can be attached to a plurality of wheel lug bolts 17 of a vehicle. Further, the mounting member can serve as a substrate for attachment of the releasable connector. The mounting member can be a single solid piece as shown in FIG. 1, or can include multiple parts. Typically, the mounting member can be configured to attach to at least three lug bolts for improved stability. Suitable mounting members can include plates similar to that shown. Alternatively, the mounting member can be contoured or formed from several pieces which are secured together. As a general guideline, the mounting member can be formed of any rigid material which is sufficient to hold and maintain the wheel cover apparatus during use, preferably over extended periods of time. Suitable non-limiting examples of such materials include steel, anodized aluminum, metal alloys, metal composites, ceramic composites, polymeric materials, and the like. Other suitable materials can include brass or zinc alloy.

The mounting member 12 can be configured for attachment to a variety of lug bolt patterns. Typical vehicle wheel assemblies have either a four, five, six or eight lug bolt pattern onto which the wheel is secured using lug nuts, although other patterns can be used. As can be seen in the figures, the mounting member can be attached to the lug bolts 17 of a wheel assembly rather than the center hub 19 or other portions of the wheel rim. This can reduce the requirements of additional hardware, and provide a secure point of attachment for the wheel cover apparatus to the wheel assembly of the vehicle.

Figure 2A:
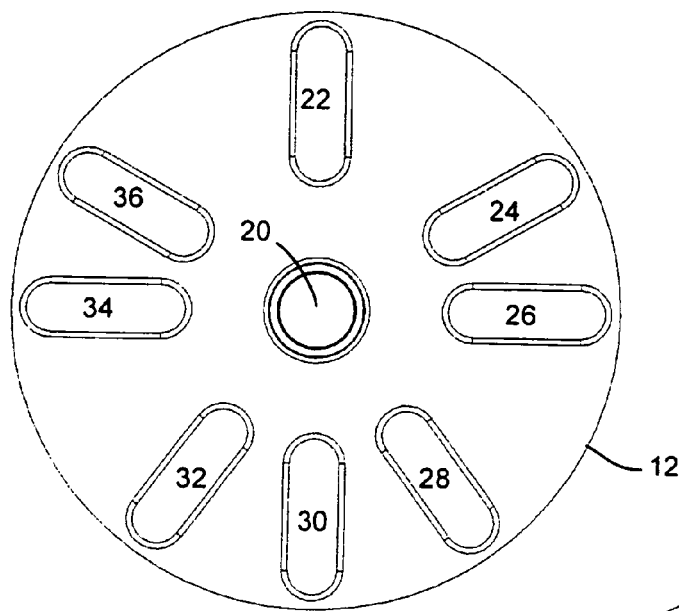
FIG. 2A is a front view of one embodiment of a mounting member configured for attachment to a plurality of lug bolt patterns.

FIG. 2A illustrates one embodiment of a mounting member having a plurality of apertures configured for attachment to a plurality of lug bolt patterns. The mounting member 12 has a center of rotation 20 about which the mounting member rotates during travel. The mounting member is preferably a flat plate as shown, although other configurations can also be used. Slots 22, 24, 26, 28, 30, 32, 34 and 36 can be formed in the mounting plate as shown. These slots are spaced apart and oriented to allow attachment to any of several different lug bolt patterns. Specifically, the mounting plate 12 can be attached to a three or six lug bolt pattern using slots 24, 30 and 36. A four or eight lug bolt pattern can be mounted using slots 22, 26, 30 and 34. Similarly, a five bolt pattern can be mounted using three slots 22, 28 and 32 or five slots 22, 24, 28, 32 and 36. Thus, only three attachment points are required as a minimum for the mounting plate to be secured to a wheel assembly. In addition, the slots allow for variation in circumference of the lug bolt pattern. For example, several sizes of four lug bolt patterns can be inserted into slots 22, 26, 30 and 34 of the mounting plate 12. Typically, larger wheels have a higher number of lug bolts therein. The pattern shown in FIG. 2A can accommodate most patterns of lug bolts, e.g., multiples of 4, 5 and 6, such as 10, 12, 16 and etc.

Figure 2B:
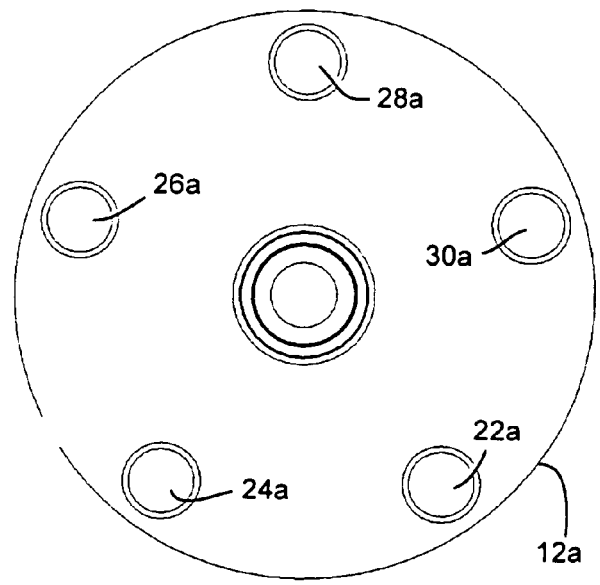
FIG. 2B is a front view of another embodiment of a mounting member in accordance with the present invention.

Generally, the mounting member 12 can have almost any number of apertures therein, corresponding to the lug bolts of a wheel assembly. Of course, the apertures can be formed in the mounting member specifically for a single lug bolt pattern. For example, a pattern of four circular holes can be formed in the mounting member. FIG. 2B illustrates a mounting plate 12*a* having five circular holes 22*a*–30*a*. Alternatively, the mounting member can have a plurality of apertures configured for use with a plurality of lug bolt patterns, as described above. Thus, the same mounting member can be used with multiple wheel assemblies. In one aspect, the apertures can be oriented radially from a center of rotation and configured for attachment to a plurality of lug bolt patterns. Further, the apertures can be slots, circular, or any functional shape which allows for insertion of lug bolts therein.

The mounting member can be directly mounted to the lug bolts by insertion of the lug bolts into apertures of the mounting member. Alternatively, lug bolt adapters can be used which effectively extend the lug bolt length. Such adapters can be used to adjust the distance between the vehicle wheel and the wheel cover apparatus. FIG. 1 illustrates one example of such a lug bolt adapter 18 in each of apertures 22, 32 and 36.

Figure 3:
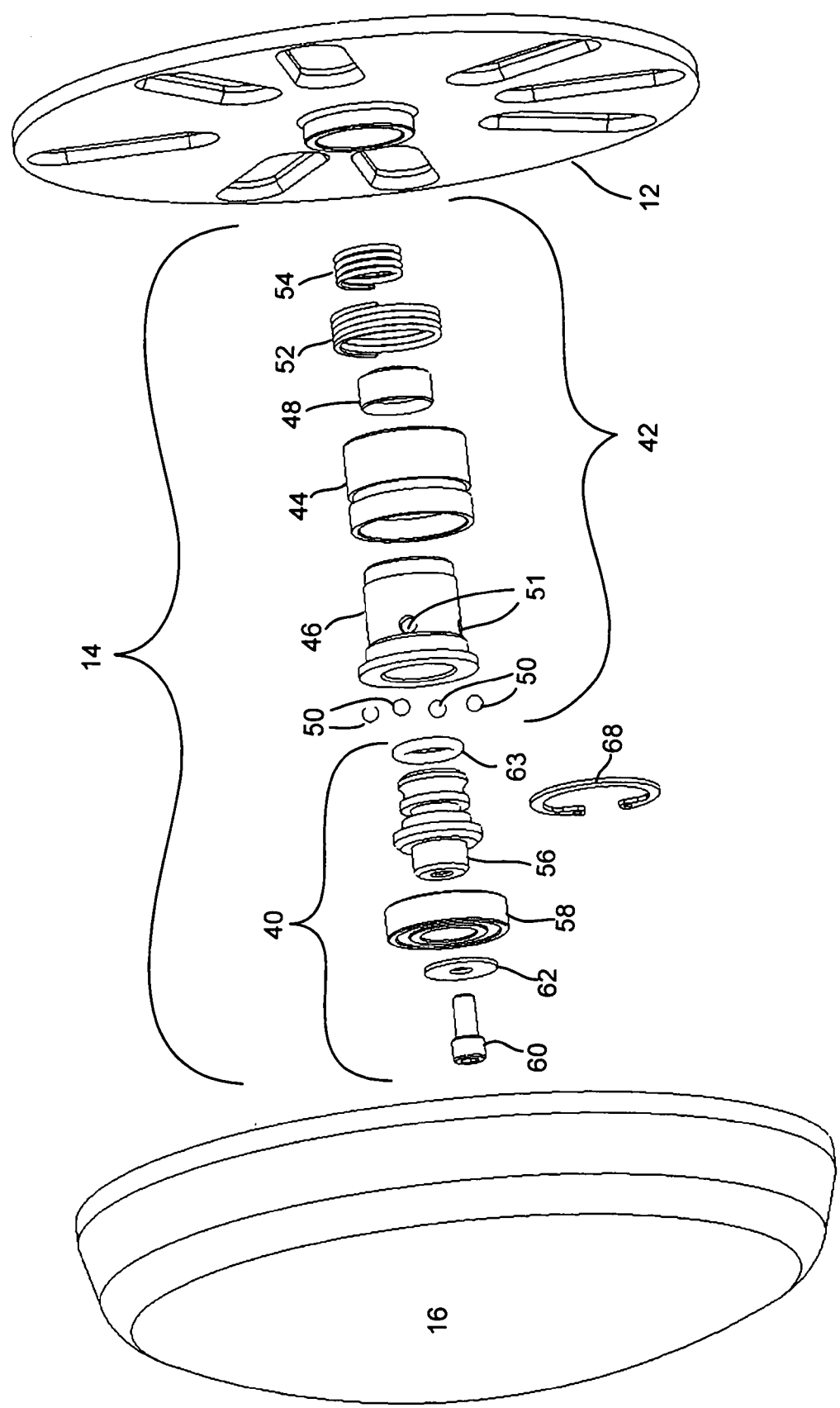
FIG. 3 is an exploded perspective view of the embodiment shown in FIG. 1.

Referring again to FIG. 1, the releasable connector assembly 14 is operatively connected to the mounting member 12. Typically, the connector assembly is located at a center of rotation (indicated by numeral 20 in FIG. 2A) in order to facilitate concentric rotation of the connector assembly during rotation of the vehicle wheel about an axis of rotation. Alternatively, the connector assembly could be connected such that the assembly is not concentric with the axis of rotation. Although other configurations can be used, FIG. 3 illustrates an engaging assembly 40 which is configured for releasable connection to the receiving assembly 42. The releasable connection can be provided by any number of release mechanisms. One suitable release mechanism is a ball lock mechanism as illustrated in FIGS. 1 and 3, which is described in more detail below.

One of the receiving assembly and the engaging assembly can be attached to the mounting plate, depending on the particular design. In the embodiment shown in FIG. 1, the receiving assembly 42 (shown in FIG. 3) is attached to the mounting member 12. The receiving assembly is attached at the center of rotation using any known mechanism such as interference fitting, welding, screw fitting, lock pin, and the like. As such, the receiving assembly can include a releasable detent and the corresponding engaging assembly can include an engagement surface configured to accept the releasable detent.

In the embodiment shown in FIG. 3, the receiving assembly 42 includes an outer sleeve 44, an inner sleeve 46, a retaining sleeve 48, ball locks 50, and springs 52 and 54. As shown in FIG. 1, the assembled receiving assembly has the inner sleeve 46 interference fitted to the mounting member 12. The outer sleeve 44 is placed concentrically outside of the inner sleeve with a spring 52 therebetween. In addition, ball locks 50 are placed in holes 51 formed around a circumference in the inner sleeve. The holes are sized slightly smaller than the diameter of the ball locks such that the ball locks protrude beyond the inner surface of the inner sleeve a predetermined distance. Typically, the predetermined distance corresponds to a distance sufficient to engage a corresponding groove or member of the engaging assembly which is discussed in more detail below. The retaining sleeve 48 is placed along the inner surface of the inner sleeve. A spring 54 is supported between the mounting member 12 and the retaining sleeve. Thus, the receiving assembly and spring 54 are shown in a compressed engaged position in FIG. 1.

The receiving assembly can also be placed in an unengaged position. Specifically, the outer sleeve 44 can be slid toward the mounting member 12. As the outer sleeve is moved, the spring 52 is compressed. Further, the beveled inner edge of the outer sleeve allows the ball locks 50 to retract from the engaged position such that the ball locks do not substantially protrude beyond the inner surface of the inner sleeve 46. As the engaging assembly is removed, the retaining sleeve 48 then slides a sufficient distance to at least partially cover the holes in the inner sleeve in order to retain the ball locks 50 in a retracted position. Typically, an edge or lip can be formed on an inner surface of the inner sleeve 46 to limit the distance the retaining sleeve 48 can slide.

A suitable corresponding engaging assembly can include any number of configurations and/or aspects which allow for releasable connection in the receiving assembly. Referring once again to FIG. 3, the engaging assembly 40 includes an axle 56 which can be secured in a bearing 58 using a bolt 60 and a washer 62. An optional rubber ring 63 can be placed around a portion of the axle to improve the fit between the axle and the sleeve 46 upon engagement. Thus, the axle can rotate with respect to the bearing. The axle includes an engagement surface in the form of a groove 64. Of course, other engagement surfaces can also be used which allow for engagement by a corresponding member of the receiving assembly, e.g., ball locks 50.

Other suitable release mechanisms can also be used and include, but are not limited to, ball lock mechanisms, cam lock systems, centrifugal lock systems, slot and follower lock systems. Thus, generally the connector assembly can include a receiving assembly and an engaging assembly. Further, either the engaging assembly or the receiving assembly can be connected to the mounting plate.

Although shown in the figures as bearing 58, a rotating assembly can be optional. Thus, without a rotating assembly, the wheel cover can rotate with the mounting member. Optionally, at least one of the receiving assembly and the engaging assembly can include a rotating assembly. The rotating assembly can allow the wheel cover to rotate independently of the mounting member. Suitable rotating assemblies can include, but are not limited to, bearings (ball, pin, tapered, roller, and the like), sealed air cushion or sealed oil cushion or any rotating assembly which allows rotation of at least a portion of the connector assembly. Thus, the rotating assembly can be included in the engaging assembly. Alternatively, the rotating assembly can be included in the receiving assembly. Those skilled in the art will recognize various alterations and variations for both the receiving assembly and the engaging assembly based on the above exemplary embodiment.

A wheel cover can also be operatively connected to the releasable connector such that one of the engaging assembly and receiving assembly is connected to the wheel cover. FIG. 1 illustrates an embodiment wherein the receiving assembly 42 is connected to the mounting member 12 and the engaging assembly 40 is connected to the wheel cover 16. Alternatively, the engaging assembly could be connected to the mounting member. Further, the engaging assembly or receiving assembly can be secured to a center cavity in a weighted cap. FIG. 1 illustrates a cavity 66 integrally formed on the inner side of the wheel cover 16 having a groove 67 formed around the inner circumference of the cavity. A retaining ring 68 is inserted into the groove in order to secure the bearing 58 (or other connector assembly member) to the wheel cover. Alternatively, additional brackets or other securing means could be used to secure the connector assembly 14 to the wheel cover. For example, the rotating assembly, receiving assembly, inner sleeve, or axle could be directly welded, braced, clamped, screwed, or otherwise secured to the wheel cover.

The wheel cover 16 can have any number of configurations or designs. In one aspect of the present invention, the wheel cover can partially cover the vehicle wheel. In such embodiments, the wheel cover can have a diameter greater than the diameter of the mounting plate so as to partially or completely cover the underlying mounting member. Thus, the wheel cover apparatus of the present invention can provide theft deterrence by at least partially covering the wheel lug bolts. As a result, once the wheel cover is secured by releasably connecting the receiving assembly and engaging assembly, a standard lug wrench does not allow removal of the lug nuts because of interference by the wheel cover. For example, notice that in FIG. 1, lug nuts 21 may be attached to the threaded portion of lug bolt adapters 18, or the lug bolts 17 in their absence. The curvature and coverage of wheel cover 16 makes access to the lug nuts difficult. In this case, the wheel cover apparatus acts as a security device to prevent theft or loss of the wheel cover assembly and/or wheel. Alternatively, the wheel cover can completely cover the entire wheel. In yet another alternative, the wheel cover can be smaller than the lug bolt pattern.

The wheel cover can be formed with a decorative pattern on its outside surfaces. For example, the wheel cover itself can be shaped to include spokes, wings, or the like. Additionally, the wheel cover can include patterns, pictures, designs, text, or the like to enhance the appearance of the wheel cover.

In yet another embodiment of the present invention, the wheel cover can be weighted such that the wheel cover does not rotate with the mounting member and vehicle wheel. Specifically, a weighted wheel cover can remain in a substantially constant orientation as when at rest during rotation of the mounting member. In this way, any design or pattern on the wheel cover can be viewed during travel. FIG. 1 illustrates a wheel cover 16 having a weighted portion 70. The weighted portion can be cast or machined as an integral part of the wheel cover, or may be attached to the wheel cover, e.g., an inner surface.

The wheel cover 16 can be removed by disconnecting the receiving assembly 42 from the engaging assembly 40. Disconnecting can be accomplished relatively quickly. The releasable connector assembly can include a ball lock mechanism such as that illustrated; however, other mechanisms could also be used, e.g., external detents, latches, pins and the like. In one aspect, the spring 52 can be designed such that the outer sleeve 44 can be easily slid by hand. This can be accomplished by adjusting the material and/or dimensions of the spring to reduce the spring stiffness. The spring, of course, can be substituted with alternative mechanisms for allowing the outer sleeve to have an engaged and unengaged position. For example, the inner surface of the outer sleeve could be threaded with corresponding threads on the inner sleeve. Similarly, the outer sleeve could be configured with a safety release clutch. Those skilled in the art can design additional alternative mechanisms suitable for allowing engagement and release of the receiving assembly and engaging assembly.

Figure 4:
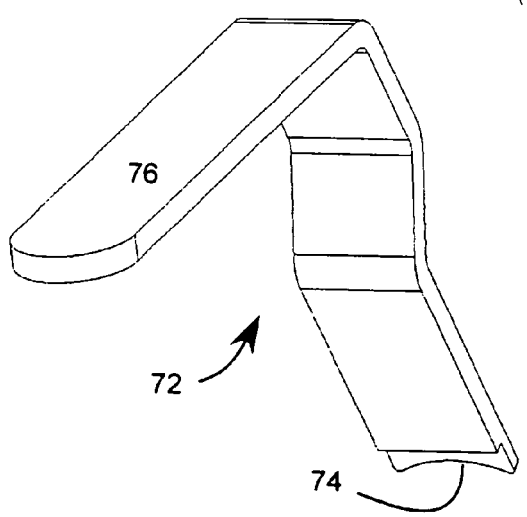
FIG. 4 is a perspective view of a release key for use with the embodiment shown in FIGS. 1 and 3.

Alternatively, spring 52 can be designed such that a release key is necessary in order to slide the outer sleeve sufficient to disengage the lock balls 50. As such the release key can be engagable with the releasable connector assembly and configured to facilitate release of the engaging assembly from the receiving assembly. For example, FIG. 4 illustrates one possible release key configuration which is a contoured lever. The contoured lever 72 has a curved lip 74 and a handle 76. The curved lip is sized to fit into a release groove 78 (shown in FIG. 1). The contoured lever 72 is bent in order to facilitate insertion between the wheel cover 16 and mounting member 12 as shown in FIG. 1. In this example, the release key acts as a lever to disconnect the receiving assembly and engaging assembly. It will be understood that other release key configurations are within the scope of the present invention.

As an additional feature of the present invention, it can be desirable to attach the release key to the vehicle in order to prevent loss. Thus, for example, the release key can be attached to a storage rack or snap holder (not shown) which is secured to a desired location in the vehicle. Alternatively, the key can be attached to a retractable cord connected to the vehicle, e.g., in the trunk.

Thus, there is disclosed an improved apparatus and method for providing a releasably connected wheel cover. The above description and examples are intended only to illustrate certain potential embodiments of this invention. It will be readily understood by those skilled in the art that the present invention is susceptible of a broad utility and applications. Many embodiments and adaptations of the present invention other than those herein described, as well as many variations, modifications and equivalent arrangements will be apparent from or reasonably suggested by the present invention and the foregoing description thereof without departing from the substance or scope of the present invention. Accordingly, while the present invention has been described herein in detail in relation to its preferred embodiment, it is to be understood that this disclosure is only illustrative and exemplary of the present invention and is made merely for purpose of providing a full and enabling disclosure of the invention. The foregoing disclosure is not intended or to be construed to limit the present invention or otherwise to exclude any such other embodiment, adaptations, variations, modifications and equivalent arrangements, the present invention being limited only by the claims appended hereto and the equivalents thereof.

What is claimed is:

1. A wheel cover apparatus, comprising:
   a) a mounting member, configured to attach to a plurality of wheel lug bolts;
   b) a quick-release connector assembly, operatively connected to the mounting member, said connector assembly comprising a receiving assembly and an engaging assembly wherein the engaging assembly is releasably connectable to the receiving assembly; and
   c) a wheel cover operatively connected to the quick-release connector and wherein at least one of the receiving assembly and the engaging assembly includes a rotating assembly configured to allow the wheel cover to rotate independently of the mounting member.

2. The apparatus of claim 1, wherein the engaging assembly includes the rotating assembly, said rotating assembly being a bearing.

3. The apparatus of claim 1, wherein the receiving assembly includes the rotating assembly, said rotating assembly being a bearing.

4. The apparatus of claim 1, wherein said wheel cover is weighted, such that the wheel cover remains in a substantially constant orientation during rotation of the mounting member.

5. The apparatus of claim 1, wherein said mounting member is a mounting plate having a plurality of apertures, said apertures being oriented radially from a center of rotation of the mounting plate and configured for attachment to wheel lug bolts arranged in any of a plurality of lug bolt patterns.

6. The apparatus of claim 5, wherein said lug bolt pattern is a four, five, six, or eight lug bolt pattern.

7. The apparatus of claim 5, wherein said lug bolt pattern is a five bolt pattern.

8. The apparatus of claim 1, wherein the receiving assembly is connected to the mounting member and the engaging assembly is connected to the wheel cover.

9. The apparatus of claim 1, wherein the receiving assembly further comprises a releasable detent, and the engaging assembly further comprises an engagement surface configured to accept the releasable detent.

10. The apparatus of claim 9, wherein said releasable detent is a plurality of ball locks, and the engagement surface is a groove.

11. The apparatus of claim 1, wherein the wheel cover at least partially covers the wheel lug bolts.

12. The apparatus of claim 1, further comprising a release key engagable with the quick-release connector assembly, and configured to facilitate release of the engaging assembly from the receiving assembly.

13. The apparatus of claim 12, wherein the release key is a contoured lever.

14. The apparatus of claim 1, further comprising a lug bolt adapter configured to increase distance between the mounting member and a vehicle wheel.

15. The method of claim 1, wherein said wheel cover is weighted, such that the wheel cover remains in a substantially constant orientation during rotation of the mounting member.

16. The apparatus of claim 1, wherein the quick-release connector assembly is a member selected from the group consisting of ball lock mechanisms, cam lock systems, centrifugal lock systems, and slot and follower lock systems.

17. A wheel cover apparatus, comprising:
   a) a mounting member, having a center and being configured to attach to a plurality of wheel lug bolts, wherein said mounting member is a mounting plate having a plurality of slots, said slots being oriented radially from the center and configured for attachment to lug bolts arranged in any of a plurality of lug bolt patterns;
   b) a quick-release connector assembly, operatively connected to the mounting member, said connector assembly comprising a receiving assembly and an engaging assembly, wherein the engaging assembly is releasably connectable to the receiving assembly, and wherein the engaging assembly includes a bearing configured to allow at least a portion of the quick-release connector to rotate independently of the mounting member, and wherein the receiving assembly further comprises a releasable detent and the engaging assembly further comprises an engagement surface configured to accept the releasable detent; and
   c) a wheel cover, operatively connected to the quick-release connector assembly, said wheel cover being weighted such that the wheel cover remains in a substantially constant orientation during rotation of the mounting member.

18. A method of enhancing a vehicle wheel, comprising the steps of:
   a) securing a mounting member to a wheel assembly having a plurality of lug bolts, said mounting member including a first portion of a quick-release connector assembly, wherein the quick-release connector assembly includes a rotating member configured to allow at least a portion of the quick-release connector assembly to rotate independently of the mounting member; and
   b) releasably connecting a wheel cover to the mounting member, such that a second portion of the quick-release connector assembly is associated with the wheel cover and said second portion is connected to the first portion, such that the wheel cover is releasably secured to the mounting member.

19. The method of claim 18, further comprising the step of removing the wheel cover from the mounting member by disconnecting the first portion from the second portion.

20. The method of claim 19, wherein the step of removing further comprises using a release key to disconnect the first portion from the second portion.

21. The method of claim 18, wherein the first portion is concentric with an axis of rotation of the mounting member.

22. The method of claim 18, wherein one of the first and second portions is a receiving assembly and one of the first and second portions is an engaging assembly.

23. The method of claim 22, wherein the first portion is the receiving assembly which further comprises a releasable detent, and the second portion is the engaging assembly which further comprises an engagement surface configured to accept the releasable detent.

24. The method of claim 18, wherein the step of releasably connecting a wheel cover includes at least partially covering the mounting member.

25. The method of claim 18, wherein the quick-release connector assembly is a member selected from the group consisting of ball lock mechanisms, cam lock systems, centrifugal lock systems, and slot and follower lock systems.

* * * * *